United States Patent Office 2,740,382
Patented Apr. 3, 1956

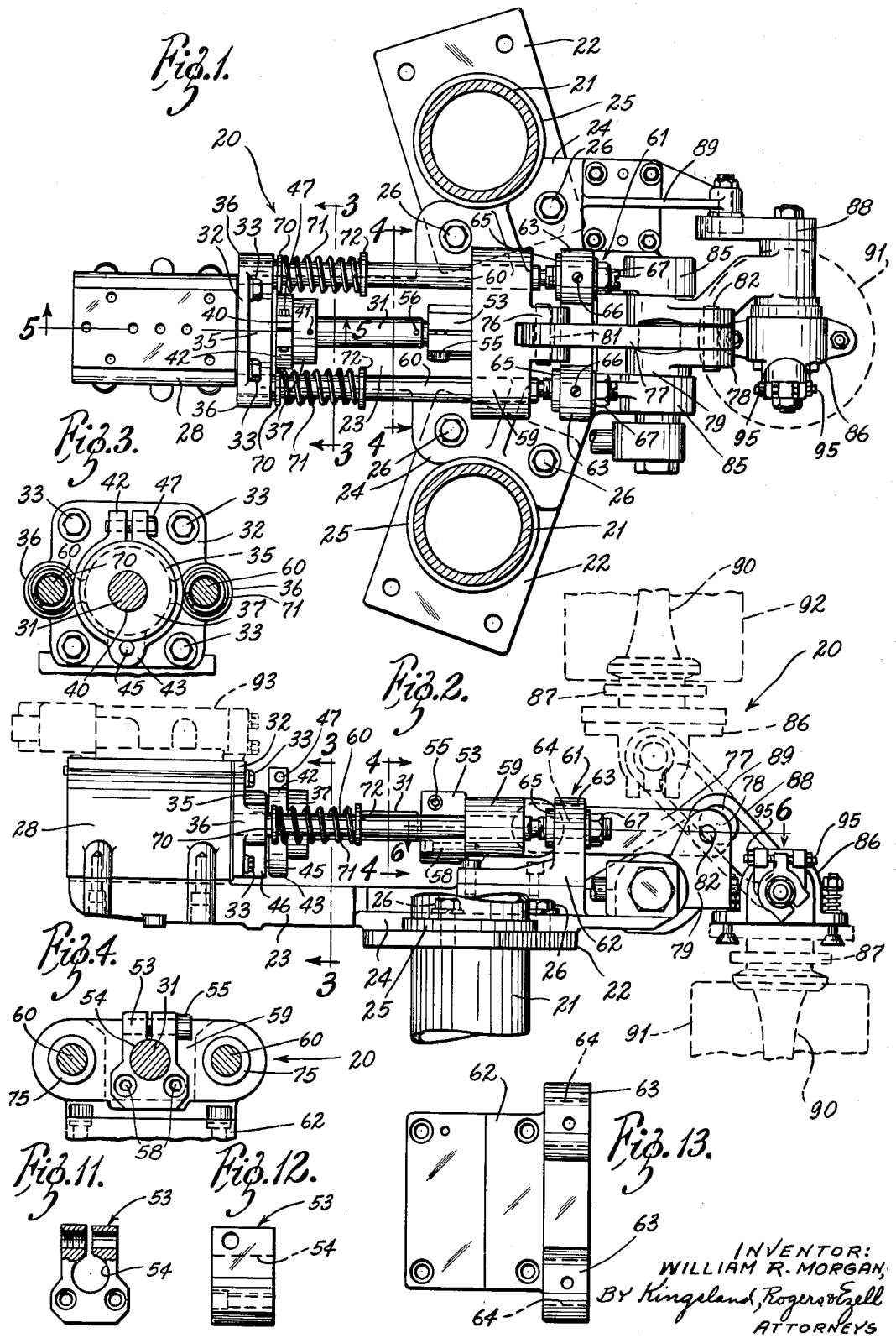

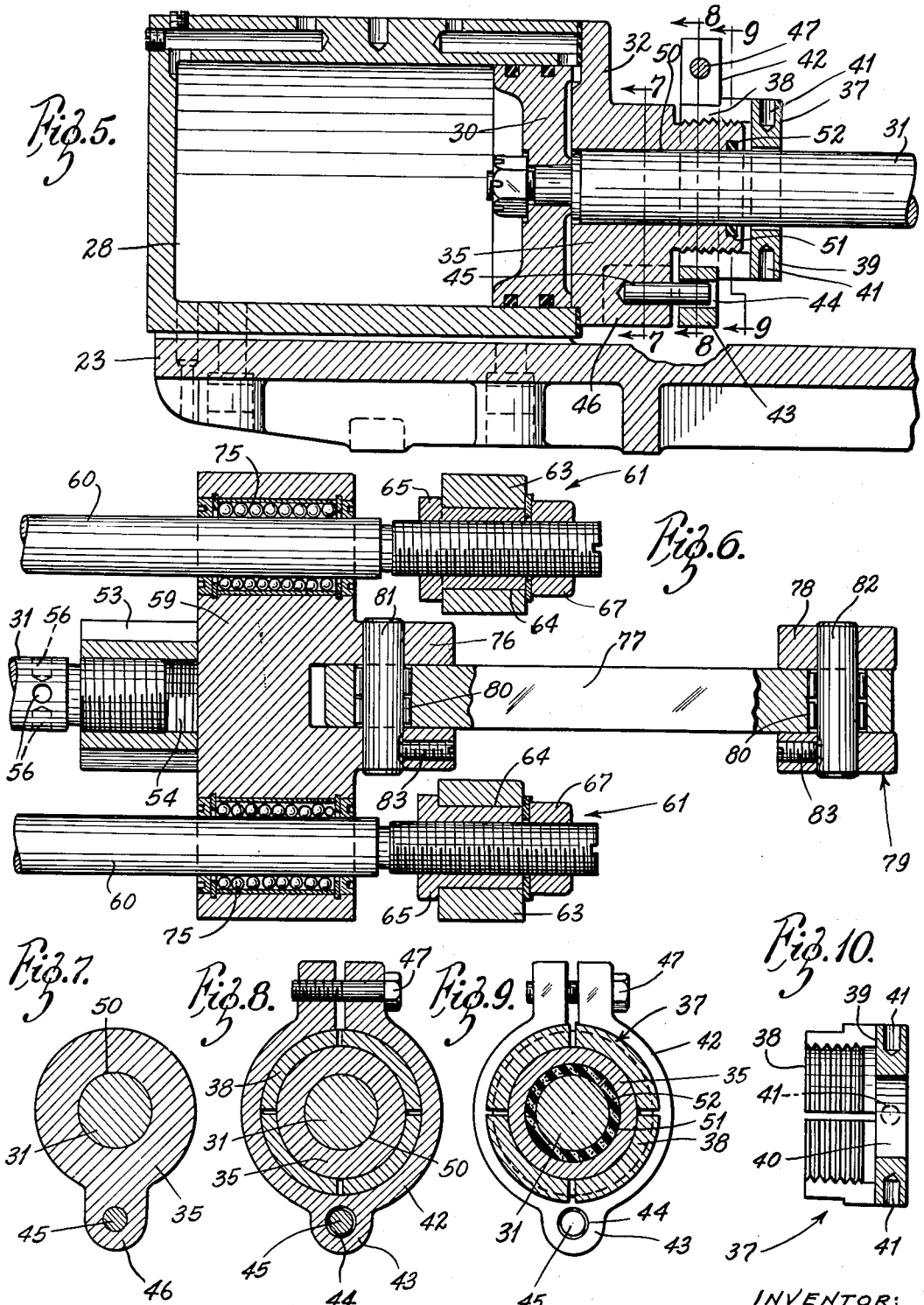

2,740,382
ADJUSTABLY CONTROLLED GLASSWARE TRANSFER MECHANISM

William R. Morgan, Canton, Ohio

Application September 26, 1952, Serial No. 311,717

5 Claims. (Cl. 121—38)

The present invention relates to a glassware transfer mechanism, and more particularly to one in which a vacuum head is pneumatically displaced and inverted from one predetermined position to another.

This invention relates especially to a transfer mechanism of the general type exemplified by the transfer device in the application of Samuel E. Winder, Serial No. 688,470, filed August 5, 1946, for Bottle Forming Machine.

In that application, the transfer device there illustrated involves a support upon which is mounted a pneumatic motor having a piston rod connected by appropriate linkage to the movable vacuum head. A means for adjusting the stroke of the piston rod is provided in the form of an adjusting screw which is engaged through the cylinder head opposite that through which the piston rod passes. This screw may be adjusted along the axis of the motor cylinder so as to abut with the retracted piston and thus limit the total stroke of the piston at a desired point. The location of this adjusting screw, however, is such that when the transfer device is assembled in the bottle forming machine, adjustment of the piston stroke is inconvenient. In addition, the Winder application discloses a crosshead which is slidably supported on the aforementioned support and which is further guided by a pair of cantilevered guide rods anchored in the cylinder head and passing slidably through the crosshead. The crosshead is, of course, connected to the piston rod for movement therewith, and the latter extends beyond the crosshead for pivotal connection with a connecting rod. The connecting rod is adjustable in length and is, in turn, connected to a bell crank lever. The adjustability of the connecting rod, in conjunction with the ability to adjust the stroke of the motor piston, enables the vacuum head, which is connected to move with the above-mentioned bell crank, to be adjusted to appropriate predetermined limiting positions.

It is an object of the present invention to provide a transfer mechanism in which the adjustments for both the stroke of the piston and the length of the linkage connected thereto are more easily accessible with the mechanism in assembled position on the bottle forming machine.

It is another object of the invention to provide a smoother operating glassware transfer mechanism through the elimination of sliding surfaces and the substitution therefor of frictionless bearings.

In the drawings:

Fig. 1 is a plan view of a transfer mechanism shown supported between adjacent wind columns of a bottle forming machine, the upper end of a blank mold of the bottle forming machine being shown in dotted outline;

Fig. 2 is a side elevational view of the transfer mechanism with certain associated parts depicted in dotted lines to illustrate their cooperation with the assembly;

Figs. 3 and 4 are fragmentary sectional views taken generally along the lines 3—3 and 4—4, respectively, of Figs. 1 and 2;

Figs. 5 and 6 are enlarged fragmentary sectional views taken generally along the line 5—5 of Fig. 1 and the line 6—6 of Fig. 2, respectively, parts in the background being omitted for the sake of clarity;

Figs. 7, 8 and 9 are sectional views taken generally along respective lines 7—7, 8—8 and 9—9 of Fig. 5;

Fig. 10 is a sectional elevation through a removed piston stroke adjusting nut;

Fig. 11 is an end elevational view, partly in section, of a removed piston rod adjusting nut;

Fig. 12 is a side elevational view of the removed piston rod adjusting nut of Fig. 11; and Fig. 13 is a top plan view of a removed guide rod bracket.

Referring to the drawings more particularly by means of reference numerals, the numeral 20 indicates generally a transfer mechanism constructed in accordance with the teachings of the present invention. The mechanism 20 is shown in Figs. 1 and 2 mounted on a portion of a glass bottle forming machine. While the present invention is not limited to a particular machine, reference to the Winder application Serial No. 688,470, filed August 5, 1946, will show the machine for which this mechanism is especially adapted. In that machine, the mechanism 20 is disposed between vertical columns 21 having horizontal flanges 22.

The mechanism 20 itself comprises a base casting or support 23 having two lateral extensions 24 that are adapted to rest upon and be supported by the flanges 22 of the columns 21. It will be noted that each lateral extension 24 is adapted to interfit with circular ridges 25 adjacent the upper surfaces of the flanges 22, the extension 24 being shaped to fit accurately around the outer arcuate surfaces of these ridges for easy positioning of the transfer mechanism, and for holding them in place, since the extensions cannot be pulled out when so engaged. A transfer mechanism may be easily removed, however, by lifting it over the ridges and then drawing it outwardly. As is shown, the flanges 22 are rectangular in shape, so as to receive the lateral projections 24 and provide space for screws or bolts 26.

At the left end (as shown) of the support casting 23, there is mounted a cylinder 28. Preferably, the cylinder 28 is positioned on the support 23 by conventional dowel means so that the parts may be interfitted accurately. The cylinder is held to the casting by screws that pass upwardly through the bottom of the casting.

The cylinder 28 contains a piston 30 (Fig. 5) reciprocable therein, this piston having a piston rod 31 that passes outwardly through a cylinder head 32 secured by screws 33 to the cylinder. This cylinder head has three horizontally extending bosses, including a central boss 35 and two laterally disposed bosses 36. The central boss 35 has a threaded projection thereon, over which a piston stroke adjusting nut 37 is engaged.

The nut 37, as shown in Fig. 10, has a segmented skirt portion 38 which is internally threaded and an annular head portion 39 having an axial bore 40 through which the piston rod 31 passes freely. The head portion 39 also contains a plurality of radially extending wells 41 adapted to receive an appropriate tool for turning the nut. Adjacent its free end the skirt portion 38 has its external diameter reduced to provide a seat for a split collar 42. The collar 42 has a depending boss portion 43 containing an aperture 44 in which is received a pin 45 secured in a complementary depending boss portion 46 in the central boss 35 of the cylinder head 32. The collar 42 also includes a screw 47 adapted to tighten the same about the skirt portion 38 of the adjusting nut 37.

The central boss 35 has a bore 50 provided with an internal annular groove 51 for a sealing element such as the O-ring 52. The piston rod 31 passes slidably through the bore 50 and extends therebeyond for threaded connection with a piston rod adjusting nut 53. The nut 53, shaped as clearly shown in Figs. 11 and 12, has a threaded bore 54 which receives the free end of the piston rod 31 and is also of split construction by virtue of which a clamping screw 55 is adapted to maintain a predetermined adjustment between the nut 53 and the piston rod 31. It will be noted (Fig. 6) that the piston rod 31 is provided with a plurality of radially extending wells 56 adjacent the threaded end portion thereof, by means of which wells the piston rod 31 may be rotated relative to the nut 53 for proper adjustment therein.

The piston rod adjusting nut 53 is secured by means of screws 58 to a crosshead 59.

The crosshead 59 is adapted to reciprocate along parallel guide rods 60, each secured at one end in a boss 36 on the cylinder head 32 and supported at the other end by means of a bracket assembly 61. This latter assembly comprises a bracket 62, accurately located by dowels and bolted to the support 23. As best shown in Figs. 2 and 13, the bracket 62 has spaced upstanding elements 63 each provided with a bore 64 for slidably receiving a flanged bushing 65. Each bushing 65 is retained in the position as shown in Fig. 6 by means of a set-screw 66, the latter being best shown in Fig. 1. Each of these bushings 65 threadedly receives one end of a rod 60, the latter being longitudinally adjustable therein and adapted to be retained in adjusted position by means of a jam nut 67. A slot is provided in the threaded end of each rod 60 for adjusting the same by means of a screw driver.

As above mentioned, one end of each guide rod 60 is received in a boss 36 of the cylinder head 32 and is slidable therein up to an annular flange portion 70 of the rod 60. Clearly, when a rod 60 is adjusted longitudinally in the bracket assembly 61, the flange 70 is caused to move either toward or away from the cylinder head 32. A pair of coiled springs 71, along with a pair of washers 72, are engaged around the two rods 60 so as to react against the flanges 70. It will be seen that when the crosshead 59 moves toward the cylinder 28 it will compress the springs 71, thus cushioning and decelerating the end of this stroke of the piston.

Appropriate frictionless bearings 75 are preferably provided for the crosshead 59 to enhance the smoothness of reciprocation. The forward end of the crosshead 59 is provided with clevis means 76 for receiving one end of a connecting link 77, the other end of this link being received in a similar clevis arrangement 78 on a bell crank 79. Preferably, both ends of the link 77 are provided with appropriate bearings 80 for pivotal engagement with pivot pins 81 and 82 in the clevis arrangements 76 and 78, respectively. The pivot pins 81 and 82 are retained in assembled positions by means of setscrews 83.

The remainder of the transfer mechanism 20 is preferably identical in construction to the transfer device disclosed in the aforementioned Winder application. Briefly, the bell crank member 79 is pivotally mounted on the extreme forward or right hand end (as shown) of the support casting 23. At its outer end the bell crank 79 carries a swinging transfer head assembly 86 which, in turn, carries a vacuum head 87 as shown in dotted outline in Fig. 2. The head assembly 86 includes a link 88 slidably and pivotally connected to a roller bracket 89 secured to the support 23. As clearly disclosed in the above-mentioned Winder application, rocking of the bell crank 79 causes the swinging head assembly 86 to move between the positions shown in dotted outline in Fig. 2, thereby to transfer a glass parison 90 from a blank mold 91 to a finish mold 92. Rocking of the bell crank 79 is, of course, caused by the reciprocation of the piston 30 in the cylinder 28, which reciprocation is controlled by the timed action of a valve 93.

*Operation*

The operation of the transfer mechanism 20 is similar to that of its prototype disclosed by Winder, except for control and adjustment of the travel of the reciprocating elements. Since, for proper operation of the bottle forming machine with which the mechanism 20 is associated, it is necessary to dispose the vacuum head 87 accurately in its alternate up and down position, it is very desirable that the end points of reciprocation of the piston 30 be adjustable with the mechanism 20 in installed position. Thus, the instant mechanism 20 is arranged to provide accessibility to its adjustable elements from the front or right hand end of the device as depicted.

The retraction stroke of the piston 30 is limied by abutment of the piston rod adjusting nut 53 with the piston stroke adjusting nut 37. An appropriate tool inserted in the wells 41 of the nut 37 serves to adjust the latter axially along the threaded portion of the boss 35. Upon the determination of an appropriate adjustment, the nut 37 is retained in position by tightening the screw 47 in the clamp 42, thereby securing the latter to the nut 37. Rotation of both the collar 42 and the nut 37 is then restrained by the pin 45 engaging the hole 44 in the boss portion 43 of the collar 42. As is obvious from the drawings, this adjustment controls the "up" position of the vacuum head 87.

The "down" position of the head 87 is determined by the total length of the linkage connecting the piston 30 with the bell crank 79. The length of this linkage is adjusted by inserting an appropriate tool in the wells 56 of the piston rod 31 so as to adjust the threaded end of the rod 31 along the threaded portion of the piston rod adjusting nut 53. Upon proper adjustment being made, the nut 53 is clamped upon the threaded portion of the piston rod 31 by tightening the screw 55. It may be mentioned that the angular adjustment of the head 87 about a horizontal line through its pivoted connection with the bell crank 79 is adjustable by means of screws 95, this adjustment being similar to that for the aforementioned prototype of the instant transfer mechanism 20.

The decelerating action exerted by the springs 71 is adjustable by turning the guide rods 60 in the threaded bushings 65, which changes the location at which the crosshead 59 abuts with the washers 72 where deceleration begins. The rods 60 are maintained in their adjusted position by tightening the jamb nuts 67.

Replacement of a mechanism 20 in a bottle forming machine is accomplished quickly and easily in a manner similar to that for its previously mentioned prototype. The screws 26 which attach the mechanism between adjacent columns 21 are removed and the mechanism is then lifted to clear the ridges 25, whereupon it may be withdrawn radially outward from the bottle forming machine. A new unit may be installed by reversing the process, automatic alignment being attained by engagement of the arcuate edges of the projections 24 with the ridges on the columns. When the present invention is used on a multiple machine such as that shown in the Winder application, a suitable number of the mechanisms 20 will be disposed around the supporting framework of the machine so that they may be actuated during rotation of the frame. It is apparent that the present construction lends itself not only to ready interchangeability of the parts, but to increased ease of servicing and adjusting the equipment.

What is claimed is:

1. In a transfer mechanism for glassware, a base, a reciprocating driving member mounted on the base, a movable crosshead mounted on the base, a rockable member mounted on the base, means interconnecting the driving member, the movable crosshead and the rockable member for simultaneous reciprocating movement, said interconnecting means including means for adjusting both the crosshead and the rockable member relative to the driving member, means for adjusting the reciprocating stroke of the driving member, and resilient cushioning means engageable by the crosshead at one end of its movement, said cushioning means being adjustably supported for selective control of its cushioning action.

2. In a transfer mechanism for glassware, a base, a reciprocating driving member mounted on the base, parallel guide rods adjustably mounted on the base, a crosshead movably supported on the guide rods, means adjustably interconnecting the driving member with the crosshead, a cushioning spring on each guide rod, said springs being engageable with the crosshead for decelerating the same at one end of its movement, and means for adjusting the position of the springs relative to the base to vary the point of engagement with the crosshead.

3. In a transfer mechanism for glassware, an air cylinder including a cylinder head having a threaded projection, a piston rod connected to the piston and extending slidably through the projection on the cylinder head, a movably mounted element connected to the piston rod outside the cylinder, means threadedly received on said cylinder head projection for abutment with said movably mounted element for adjusting the stroke of the piston rod, said latter means comprising a piston stroke adjusting nut having an annular head portion and an internally threaded segmented skirt portion, and clamping means disposed around said skirt portion for maintaining the piston stroke adjusting nut in adjusted position.

4. In transfer mechanism for glassware, a base, an air cylinder including a reciprocable piston rod mounted on the base, an upstanding bracket mounted on the base and spaced axially from the cylinder, guide rods disposed parallel to said piston rod and extending between said cylinder and said bracket, a crosshead mounted for reciprocation on said guide rods, said crosshead being connected with said piston rod, spring cushioning means mounted on said guide rods for cushioning engagement with said crosshead upon movement of the latter in one direction of reciprocation, and means for moving said cushioning means relative to said cylinder for varying its cushioning effect upon said crosshead.

5. In a transfer mechanism for glassware, a base, an air cylinder including a reciprocable piston rod mounted on the base, an upstanding bracket mounted on the base and spaced axially from the cylinder, guide rods disposed parallel to said piston rod and extending between said cylinder and said bracket, a crosshead mounted for reciprocation on said guide rods, said crosshead being connected with said piston rod, spring cushioning means mounted on said guide rods for cushioning engagement with said crosshead upon movement of the latter in one direction of reciprocation, means for moving said cushioning means relative to said cylinder for varying its cushioning effect upon said crosshead, said means for moving the cushioning means comprising means including threaded means mounting said guide rods for axial movement relative to the base, and means on the guide rods abutting the ends of the cushioning means remote from the crosshead, and means for securing the guide rods in adjusted position.

References Cited in the file of this patent

UNITED STATES PATENTS

| | | |
|---|---|---|
| 1,165,811 | Stafford | Dec. 28, 1915 |
| 1,206,707 | Hunter | Nov. 28, 1916 |
| 1,230,049 | Stafford | June 12, 1917 |
| 1,295,934 | Snyder | Mar. 4, 1919 |
| 1,370,924 | Smith | Mar. 8, 1921 |
| 1,863,448 | Landenberger et al. | June 14, 1932 |
| 2,252,939 | McCoy | Aug. 19, 1941 |
| 2,373,226 | Coates | Apr. 10, 1945 |
| 2,637,054 | Holmes | May 5, 1953 |